Patented Feb. 4, 1930

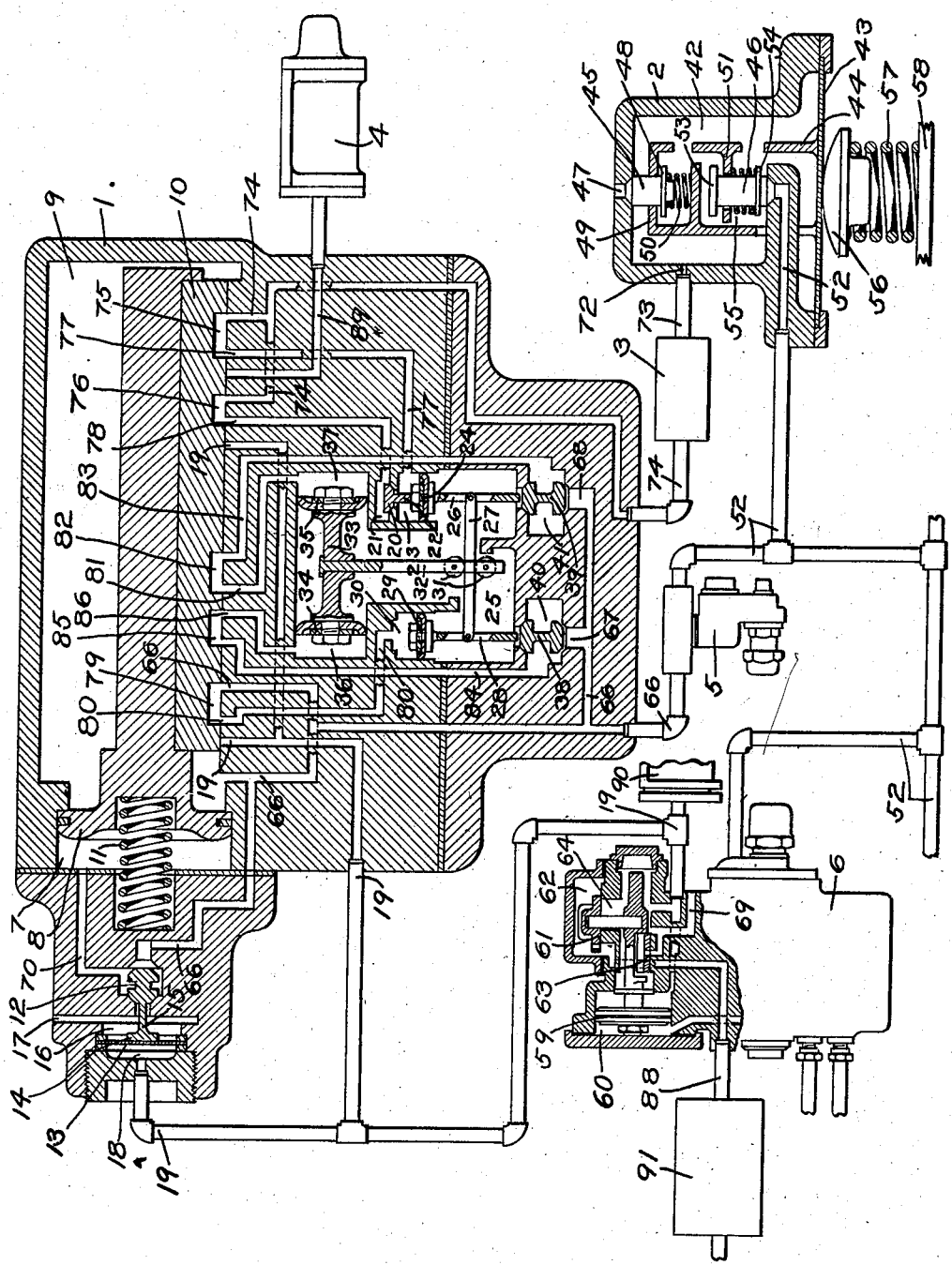

1,746,044

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

VARIABLE-LOAD BRAKE

Application filed November 22, 1928. Serial No. 321,048.

This invention relates to fluid pressure brakes and more particularly to means for varying the braking power on a vehicle in accordance with the load carried.

In the usual locomotive fluid pressure brake equipment, the brakes on the tender are applied at the same time and with the same degree of force as the brakes on the locomotive, so that if the braking apparatus is adjusted to effect the proper braking power on an empty tender, then when the tender is loaded, the braking power is decreased to a degree that is undesirable for efficient train control.

One object of my invention is to provide an improved brake apparatus for varying the braking power, or brake cylinder pressure obtained upon an application of the brakes on a tender in accordance with the load carried.

Another object of my invention is to provide an improved braking apparatus of the above character which is automatically adjusted upon a change in the load on a tender.

Another object of my invention is to provide an improved variable load brake apparatus for tenders, which will operate at the same time and in harmony with the brakes on the locomotive.

Other objects and advantages will appear in the following more detailed description of the invention.

In the accompanying drawing, the single figure is a diagrammatic view, mainly in section, of a variable load brake apparatus embodying my invention.

As shown in the drawing, the variable load brake apparatus comprises a variable load valve device 1, a regulating valve device or control mechanism 2, a reservoir 3, a tender brake cylinder 4, a reducing valve device 5, and the usual distributing valve device 6.

The variable load valve device 1 comprises a casing having a chamber 7 containing a piston 8 and a valve chamber 9 containing a slide valve 10 adapted to be operated by said piston. Acting on the outer face of said piston is a spring 11 for normally maintaining said piston and slide valve in the release position, as shown in the drawing.

For controlling the operation of the piston 8, a double beat valve 12 is provided, which valve is actuated by a diaphragm 13 that engages the enlarged head portion 14 of the valve stem 15. Said diaphragm has, at one side, a chamber 16 which is in constant communication with the atmosphere through a passage 17 and at the other side, a chamber 18 which is connected to the locomotive brake cylinder 90 and distributing valve device 6 through pipe 19.

For controlling the flow of fluid to and from the tender brake cylinder 4, when the piston 8 and slide valve 10 are in their outer positions, a valve 20 is provided, which valve is contained in a chamber 21 and has a depending stem 22 extending into a chamber 23.

The valve 20 is adapted to be operated by a balancing piston 24, which is subject at one side to the pressure of fluid in the chamber 23 and subject at the opposite side to atmospheric pressure in chamber 25. The piston 24 has a downwardly extending stem 26, and pivotally secured thereto, at an intermediate point, is a lever 27. The opposite end of said lever is pivotally secured to a stem 28 which is connected to a balancing piston 29. The piston 29 is subject at one side to the pressure of fluid in a chamber 30, and at the other side is subject to the atmospheric pressure in the chamber 25.

The lever 27 is mounted between two pivots 31, preferably in the form of rollers, and is adapted to rotate thereabout upon the operation of the pistons 24 and 29. The pivots 31 are carried on a depending stem 32, which stem is rigidly secured to a stem 33 connecting two adjusting pistons 34 and 35, the piston 34 having at its outer face a chamber 36, the piston 35 having at its outer face a chamber 37, the inner faces of both of said pistons being subject to atmospheric pressure in the chamber 25. For controlling the flow of fluid under pressure to and from the piston chambers 36 and 37, two double beat valves 38 and 39 are provided, said valves being contained in chambers 40 and 41 and adapted to be operated by the depending piston stems 28 and 26, respectively.

For controlling the adjustment of the variable load valve device, the control mechanism 2 is provided, which mechanism is preferably mounted on the tender body and comprises a casing having a chamber 42, one side of said chamber being formed by a diaphragm 43 secured to the casing. Mounted on said diaphragm is a cage-like member 44 adapted to be operated in a vertical direction by deflection of said diaphragm and carrying two plunger valves 45 and 46. The valve 45 operates through an opening in a wall 49 of member 44 and is adapted to control communication between chamber 42 and the atmosphere through passage 47. Said valve 45 has a collar 48 adapted to cooperate with the wall 49 to unseat the valve, and a spring 50 is provided which acts on the collar 48 to normally maintain the valve in a projected position. The valve 46 operates through an opening in a wall 51 of the member 44 and is adapted to control communication between chamber 42 and brake pipe passage 52. Said valve 46 has an enlarged head portion 53 adapted to cooperate with one side of the wall 51 for unseating the valve, and also has a circumferential collar 54 against which a spring 55 acts to maintain said valve in a projected position, as shown in the drawing.

For the purpose of deflecting the diaphragm 43 upon a change in load on the tender, a follower 56 is provided to engage said diaphragm, said follower having a resilient connection, preferably in the form of a spring 57, to the spring plank 58 of the usual supporting truck.

For supplying fluid under pressure to apply the tender brakes and for controlling the operation of the variable load valve device 1, a distributing valve device 6, of the well known type employed in locomotive brake equipment, is provided, and comprises the usual equalizing portion and application portion.

The application portion of the distributing valve device 6 comprises an application piston 59 contained in a chamber 60, an application slide valve 61 contained in a chamber 62, and an exhaust slide valve 63 contained in a chamber 64, said slide valves being operated by the piston 59 for controlling the supply and venting of fluid under pressure to and from the locomotive brake cylinder 90 through pipe 19.

In operation, fluid at the usual reduced pressure carried in the brake pipe 52 flows to the equalizing portion of the distributing valve device 6, to the seat of valve 46 in the control mechanism 2 and to the reducing valve device 5. Fluid at a predetermined reduced pressure, as required for controlling the operation of the variable load device 1, is then supplied through said reducing valve device 5 to pipe and passage 66, which is connected to chambers 67 and 68 at the lower face of double beat valves 38 and 39 respectively, to slide valve chamber 9, to the seat of slide valve 10 and to the inner seat of the double beat valve 12.

With the application portion of the distributing valve device 6 in release position, as shown in the drawing, the brake cylinder pipe 19 and diaphragm chamber 18, which is connected thereto, are connected to the atmosphere through valve chamber 64, past the exhaust slide valve 63 and through the atmospheric passage 69, thereby permitting the pressure of fluid from passage 66 on the inner face of the double beat valve 12 to shift said valve 12 to its left hand position. Fluid under pressure then flows from passage 66 to the piston chamber 7 by way of passage 70. Since the valve chamber 9 is supplied with fluid under pressure directly from passage 66, as hereinbefore described, the fluid pressures become equal on the opposite sides of the piston 8 and the spring 11 therefore acts to hold the piston 8 and slide valve 10 in their normal positions, as shown in the drawing.

As hereinbefore described, the control mechanism 2 is mounted on the tender body, while the spring 57 is interposed between the spring plank 58 on the tender truck and the diaphragm follower 56. Consequently, with chamber 42 at atmospheric pressure, as in initially charging, the spring 57 deflects the diaphragm 43 and shifts the valve cage 44 upwardly. With the valve 45 seated, the upward movement of cage 44 causes spring 50 to be compressed, but in the case of valve 46, the wall 51 engages the valve head 53 and unseats said valve, which permits fluid at brake pipe pressure to flow from passage 52 to chamber 42 and from thence through a choked opening 72 and pipe 73 to the reservoir 3. When a pressure is thus built up in chamber 42 and the reservoir 3, which is equal to or slightly exceeds the value of spring 57, said pressure acting on the inner surface of the diaphragm 43, deflects said diaphragm downwardly, which carries the valve cage 44 to the position shown in the drawing, in which the valve 46 is seated by the spring 55, so as to prevent further increase in pressure in the chamber 42.

Fluid at the pressure supplied by the control mechanism 2 flows from the reservoir 3 through pipe and passage 74 to the seat of the slide valve 10 and from thence through cavities 75 and 76 in the slide valve and passages 77 and 78 to piston chamber 23 and valve chamber 21 respectively.

The pressure of the fluid in the piston chamber 23 acts on the balancing piston 24 and tends to shift said piston downwardly. Fluid at the predetermined constant pressure supplied by the reducing valve device 5 to passage 66, flows therefrom through cavity 79 in the slide valve 10 and passage 80 to the piston chamber 30 and acts on the balancing piston 29, tending to shift said piston downwardly.

As will be hereinafter more fully described, when the tender is fully loaded, the pivots 31 will be centrally located between the ends of the lever 27 as shown in the drawing, in which position the pressure supplied by the control mechanism 2 and acting on the balancing piston 24 will balance the pressure supplied by the reducing valve device 5 and acting on the balancing piston 29. When the tender is empty, the pivots 31 will be located to the left of the position shown in the drawing, in which position the adjusted pressure supplied by the control mechanism 2 and acting on piston 24 will balance the predetermined pressure supplied by said reducing valve device and acting on the piston 29. Thus, under all conditions between empty and load, the pivots 31 will be so located on the lever 27 in relation to the pistons 29 and 24, that the opposing forces on the opposite sides of said pivot rollers will be balanced.

In loading the tender, the pressure supplied by the control mechanism 2 and acting on piston 24 moves said piston downwardly and causes the stem 26 to engage the double beat valve 39 and seat said valve in its lower position, thereby venting the adjusting piston chamber 37 through passage 81, cavity 82 in the slide valve 10, passage 83, past the piston stem 26 and to the atmospheric chamber 25. The downward movement of the balancing piston 24 causes the balancing piston 29 to move upwardly, so that the pressure of fluid in chamber 67, below double beat valve 38, is permitted to hold said double beat valve in its upper seated position, in which fluid under pressure is permitted to flow from chamber 67 to the adjusting piston chamber 36 by way of valve chamber 40, passage 84, cavity 85 in the slide valve 10 and passage 86. Since the adjusting piston chamber 37 is at atmospheric pressure, the pressure of the fluid in chamber 36 acts to shift the adjusting pistons 34 and 35, and consequently the pivot rollers 31, to the right. Such movement changes the lengths of the lever arms between the pivot rollers 31 and balancing piston stems 26 and 28.

When the lever arm connected to piston stem 28 is increased a degree sufficient for the pressure on the balancing piston 29 to balance the pressure on piston 24, the piston 29 moves down and causes piston 24 to move upwardly, so as to permit double beat valve 39 to be returned to its upper seat by the fluid under pressure in chamber 68, which then flows to the adjusting piston chamber 37 and balances the opposing fluid pressure acting on piston 34, thereby preventing further movement of the pistons 34 and 35 and the pivot rollers 31 to the right.

With the variable load valve device adjusted for a loaded tender in the manner hereinbefore described, if it is desired to apply the brakes, the distributing valve device 6 is operated in the usual well known manner to supply fluid under pressure to the application piston chamber 60. The application piston 59 is thereby moved inwardly, the initial movement thereof shifting the exhaust slide valve 63 so as to lap the brake cylinder exhaust passage 69 and further movement shifting the supply slide valve 61 so as to permit fluid under pressure from a main reservoir 91 to flow to the locomotive brake cylinder 90 by way of pipe and passage 88, valve chamber 62, past valve 61, valve chamber 64 and from thence through pipe 19.

As the locomotive brakes are applied by the flow of fluid under pressure through the application portion of the distributing valve device 6, the fluid under pressure from pipe 19 flows to the seat of the slide valve 10 in the variable load device and to the diaphragm chamber 18, wherein it acts to deflect diaphragm 13 inwardly and shift the double beat valve 12 to its seat in the inner position, in which the fluid under pressure is vented from the piston chamber 7 to the atmosphere through passage 70, diaphragm chamber 16 and passage 17. The pressure of fluid in the valve chamber 9 acting on the inner face of piston 8 then shifts said piston to the outwardly or application position against the pressure of spring 11.

In application position of the slide valve 10 the adjusting piston chambers 36 and 37 are connected together through passage 86, cavity 82 in the slide valve and passage 81, so that during an application of the brakes, the pressure of fluid acting on the adjusting pistons 34 and 35 remains equal, so as to maintain the pivot rollers 31 in a stationary position.

Fluid at the pressure supplied to the locomotive brake cylinder also flows from pipe and passage 19, through cavity 79 in slide valve 10 and passage 80, to the balancing piston chamber 30, wherein said pressure acts on balancing piston 29 and causes said piston to move downwardly, and rotate the lever 27 counter-clockwise, thereby shifting the balancing piston 24 upwardly and unseating the valve 20.

Fluid under pressure also flows from passage 19, through cavity 76 in slide valve 10 and passage 78, to chamber 21, containing valve 20, said valve being unseated by the upward movement of piston 24, permits fluid under pressure from chamber 21 to flow to the tender brake cylinder 4 by way of piston chamber 23, passage 77, cavity 75 in slide valve 10 and passage and pipe 89. When the brake cylinder pressure acting on the balancing piston 24 becomes sufficient to rotate the lever 27 clockwise about the pivot rollers 31 against the pressure in chamber 30, acting on the balancing piston 29, the piston 24 moves downwardly, permitting valve 20 to seat, thereby preventing further flow of fluid under pressure to the brake cylinder 4 and balancing piston chamber 23.

The pressure in the locomotive brake cylinder may be increased in steps in the usual manner and a proportional increase in pressure in the tender brake cylinder 4 will result, since an increase in pressure in the balancing piston chamber 30 will cause piston 24 to open valve 20 and permit a proportional increase in pressure in chamber 23 in the same manner as hereinbefore described.

It is obvious that the pressure in the tender brake cylinder 4 will automatically be maintained against leakage to the atmosphere, since any decrease in said brake cylinder pressure results in a decrease in the pressure of fluid acting on piston 24, so that the pressure on piston 29 will cause piston 24 to operate to unseat valve 20 and permit the required amount of fluid under pressure to flow to the brake cylinder 4 to compensate for said leakage, after which, valve 20 will be closed in the same manner as hereinbefore described.

In order to effect a release of the brakes, the fluid under pressure is vented from the application piston chamber 60 in the usual well known manner. The locomotive brake cylinder pressure in exhaust slide valve chamber 64 then shifts the piston 59 to release position as shown in the drawing, in which position the brake cylinder pipe 19 is vented to the atmosphere through the exhaust valve chamber 64 and the atmospheric passage 69.

Since passage 19 is connected to the balancing piston chamber 30 and the valve chamber 21 as hereinbefore described, the fluid under pressure is vented from said chambers. The fluid under pressure from the tender brake cylinder 4 lifts the valve 20 upon a slight reduction in pressure in chamber 21 and thereby permits fluid to be vented from the tender brake cylinder to the atmosphere by way of the pipe 19.

When the pressure in pipe 19 is thus reduced to substantially atmospheric pressure, the fluid at reducing valve pressure in passage 66 acting on the double beat valve 12, shifts said double beat valve to the left hand position, as shown in the drawing, in which position the piston chamber 7 is recharged by fluid under pressure from the reducing valve device 5 through passages 66 and 70. The fluid pressures are thus balanced on the opposite sides of the piston 8 and spring 11 then forces said piston back to the release position, in which the adjusting piston chambers 36 and 37 are connected to the double beat valve chambers 40 and 41 respectively, the balancing piston chamber 30 is connected to the reducing valve 5 and the balancing piston chamber 23 and valve chamber 21 are connected to the reservoir 3 in the same manner as hereinbefore described.

When the load on the tender is decreased, the pressure of spring 57 on diaphragm 43 is correspondingly decreased and the then higher pressure of fluid in chamber 42 causes the diaphragm 43 to be deflected downwardly, moving the valve cage 44 and causing the wall 49 of the cage to engage the collar 48 on valve 45 and unseat said valve. Fluid under pressure from chamber 42 and the reservoir 3 then flows to the atmosphere through passage 47. As the pressure in chamber 42 is thus reduced, spring 57 deflects the diaphragm 43 upwardly and when reduced a degree in proportion to the decrease in load carried by the tender, the upward deflection of said diaphragm permits valve 45 to seat and the wall 49 of cage 44 to disengage collar 48 on valve 45. For any further decrease in load carried by the tender, the pressure in valve chamber 42 and the reservoir 3 is further reduced in the same manner as just described.

It is therefore evident that the pressures in chamber 42 and reservoir 3 varies directly as the load carried by the tender and is governed by the spring 57, the pressure of which varies as the distance varies between the spring plank 58 and the housing of the control mechanism 2.

Since the pressure in reservoir 3 decreases with a decrease in the load carried by the tender, the downwardly acting pressure on the balancing piston 24 is decreased. With the pivot rollers in the adjusted position for a loaded car, the pressure acting on the balancing piston 24 is insufficient to balance the pressure on piston 29, so that piston 29 is moved downwardly and causes lever 27 to rotate counter-clockwise.

The downward movement of piston 29 causes the stem 28 to engage double beat valve 38 and shift said valve to its lower seated position in which fluid under pressure is vented from the adjusting piston chamber 36. Since double beat valve 39 remains seated in its upper position, fluid at the pressure supplied by the reducing valve 5 is supplied to the adjusting piston chamber 37 and acts to shift the pistons 35 and 34 and pivot rollers 31 to the left until a position is reached at which the lever 27 is so divided that the pressure on piston 24 balances the higher constant pressure on piston 29. When such a balance is obtained, the piston 24 moves down, and causes piston 29 to move upwardly which permits the fluid under pressure in chamber 67 to seat the double beat valve 38 in its upper position and then flow to the adjusting piston chamber 36 to balance the opposing pressure in the adjusting piston chamber 37 and thus prevent further movement of the pivot rollers 31 to the left.

In this newly adjusted position, the pressure obtained in the tender brake cylinder 4 and effective upon the balancing piston 24 is less than the brake cylinder pressure on the locomotive and supplied to the balancing piston chamber 30, in proportion to the decrease in the load carried by the tender, due to the lever arm between the pivot rollers 31 and stem 26 being longer than the lever arm to stem 28.

If the load on the tender is increased, the control mechanism operates to increase the pressure in the chamber 42 and reservoir 3 in the same manner as in initially charging. The balancing pistons and adjusting pistons then operate to change the position of the pivot rollers 31, so that upon an application of the brakes the pressure obtained in the tender brake cylinder 4 is proportionately greater.

It is thus apparent that this valve mechanism operates in harmony with the usual locomotive brakes and is automatic in adjustment for so controlling the brakes on a tender as to vary the brake cylinder pressure obtained on a tender in proportion to the load carried by the tender.

The choke 72, between the reservoir 3 and chamber 42 of the control mechanism, is provided for the purpose of preventing undue fluctuations in the reservoir pressure when the control mechanism is unintentionally operated by the vibrations of the tender body relative to its trucks due to track conditions, consequently preventing undue fluctuations in pressure in chamber 23 of the variable load mechanism in order to prevent unintentional and undesirable changes in the adjustment of the variable load mechanism.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake cylinder on one vehicle of a train and means on the vehicle for supplying fluid under pressure to said brake cylinder, of a brake cylinder on another vehicle of the train, and means subject to the pressure of fluid supplied to the first mentioned brake cylinder and to the load on the second mentioned vehicle for controlling the application of the brakes on the second mentioned vehicle.

2. The combination with a brake cylinder on a locomotive and a brake cylinder on the tender of said locomotive, of means on said locomotive operative to supply fluid under pressure to said brake cylinders to effect an application of the brakes, and means interposed between said brake cylinders operative to control the supply of fluid under pressure to the second mentioned brake cylinder according to the load on the tender.

3. The combination with a brake cylinder on a locomotive and a brake cylinder on the tender of said locomotive, of means on said locomotive operative to supply fluid under pressure to the locomotive brake cylinder to effect an application of the locomotive brakes, a variable load device operative to supply fluid under pressure from the locomotive brake cylinder to the tender brake cylinder to effect an application of the tender brakes, and means for controlling the operation of said variable load device according to the load on the tender.

4. The combination with a brake cylinder on a locomotive and a brake cylinder on the tender of said locomotive, of means for supplying fluid under pressure to the locomotive brake cylinder, means subject to the pressure of fluid supplied to said locomotive brake cylinder for supplying fluid under pressure to the tender brake cylinder, and means for governing the pressure of fluid supplied to said tender brake cylinder in accordance with the load on the tender.

5. The combination with a brake cylinder on a locomotive and a brake cylinder on the tender of said locomotive, of means for supplying fluid under pressure to the locomotive brake cylinder, means subject to the pressure of fluid supplied to said locomotive brake cylinder for supplying fluid under pressure to the tender brake cylinder, means for governing the pressure of fluid supplied to said tender brake cylinder in accordance with the load on the tender, and means for adjusting the last mentioned means.

6. The combination with a brake cylinder on a locomotive and a brake cylinder on the tender of said locomotive, of means for supplying fluid under pressure to the locomotive brake cylinder, means subject to the pressure of fluid supplied to said locomotive brake cylinder for supplying fluid under pressure to the tender brake cylinder, means adapted to be adjusted to govern the pressure of fluid supplied to said tender brake cylinder, and a valve device operative according to the load on the tender for adjusting the last mentioned means.

7. The combination with a locomotive brake cylinder and a tender brake cylinder, of valve means operative to supply fluid under pressure to the locomotive brake cylinder, of a variable load mechanism operative to supply fluid under pressure from the locomotive brake cylinder to the tender brake cylinder, and a valve device operative in accordance with the load on the tender to adjust said variable load mechanism for varying the pressure of fluid supplied to the tender brake cylinder according to the load on the tender.

8. The combination with a brake cylinder on a locomotive and a brake cylinder on the tender of the locomotive, of a variable load mechanism on said tender subject to the pressure of fluid supplied to the locomotive brake cylinder for supplying fluid under pressure to the tender brake cylinder, and means operative according to the load on the tender for varying the pressure of fluid supplied to the tender brake cylinder.

9. The combination with a locomotive brake cylinder and a tender brake cylinder, of valve means operative to supply fluid under pressure to the locomotive brake cylinder to effect an application of the locomotive brakes, a variable load mechanism, a valve device subject to the pressure of fluid supplied to the locomotive brake cylinder for establishing communication through which fluid at the locomotive brake cylinder pressure is supplied to said variable load mechanism and for establishing communication through which fluid under pressure is adapted to be supplied to the tender brake cylinder, means included in said variable load mechanism subject to the pressure of fluid from the locomotive brake cylinder for controlling the supply of fluid under pressure to the tender brake cylinder through the last mentioned communication according to the load on the tender.

10. The combination with a brake cylinder on a locomotive and a brake cylinder on the tender of the locomotive, of valve means operative to supply fluid under pressure to the locomotive brake cylinder to effect an application of the locomotive brakes, a variable load mechanism on the tender subject to the load on the tender and the pressure of fluid supplied to the locomotive brake cylinder for supplying fluid under pressure to the tender brake cylinder to effect an application of the tender brakes.

11. The combination with a brake cylinder on a locomotive and a brake cylinder on the tender of the locomotive and means for supplying fluid under pressure to the locomotive brake cylinder, of means subject to the pressure developed in the locomotive brake cylinder for supplying fluid under pressure to the tender brake cylinder, and means operative according to the load on the tender for controlling the supply of fluid under pressure to the tender brake cylinder.

12. The combination with a brake cylinder on a locomotive and a brake cylinder on the tender of the locomotive and means for supplying fluid under pressure to the locomotive brake cylinder, of a valve device operative to control the supply of fluid under pressure to the tender brake cylinder, means for operating said valve comprising a piston subject to the pressure developed in the locomotive brake cylinder and a piston subject to the pressure developed in the tender brake cylinder, and means cooperating with said pistons for controlling the operation of said valve according to the load on the tender.

13. The combination with a brake cylinder on a locomotive and a brake cylinder on the tender of the locomotive and means for supplying fluid under pressure to the locomotive brake cylinder, of a valve device operative to control the supply of fluid under pressure to the tender brake cylinder, means for operating said valve comprising a piston subject to the pressure developed in the locomotive brake cylinder and a piston subject to the pressure developed in the tender brake cylinder, and means for controlling the operation of said pistons according to the load on the tender.

14. The combination with a brake cylinder on a locomotive and a brake cylinder on the tender of the locomotive and means for supplying fluid under presure to the locomotive brake cylinder, of a valve device operative to control the supply of fluid under pressure to the tender brake cylinder, means for operating said valve comprising a piston subject to the pressure developed in the locomotive brake cylinder and a piston subject to the pressure developed in the tender brake cylinder, and means for controlling the operation of said pistons according to the load on the tender, the last mentioned means comprising a lever operatively connected to said pistons and a fulcrum for said lever adjustable according to the load on the tender.

15. The combination with a brake cylinder on a locomotive and a brake cylinder on the tender of the locomotive and means for supplying fluid under pressure to the locomotive brake cylinder, means for supplying fluid under pressure to the tender brake cylinder to effect an application of the tender brakes according to the load on the tender, the last mentioned means comprising a piston subject to the pressure developed in the locomotive brake cylinder, a piston subject to the pressure developed in the tender brake cylinder, and means cooperating with said pistons and adjustable according to the load on the tender.

16. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, and valve means subject to the load on the vehicle for controlling the operation of said fluid pressure operative means.

17. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, valves operative to supply and release fluid under pressure to and from said fluid pressure operative means to control the operation thereof, means for subjecting the ends of said fulcrum lever to opposing fluid pressures for operating said valves, and valve means subject to the load on the vehicle for varying the pressure to which one end of said fulcrum lever is subjected.

18. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, valves operative to supply and release fluid under pressure to and from said fluid pressure operative means to control the operation thereof, and means for subjecting one end of said fulcrum lever to a substantially fixed pressure and means for subjecting the other end of said fulcrum lever to a pressure which is variable according to the load on the vehicle to control the operation of said valves.

19. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, means for subjecting one end of said fulcrum lever to a substantially constant pressure and means for subjecting the other end of said fulcrum lever to a pressure which is variable according to the load on the vehicle to control the operation of said valves, and a load regulated valve device for varying the pressure effective on said other end of the fulcrum lever.

20. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, means for subjecting one end of said fulcrum lever to a substantially constant pressure and means for subjecting the other end of said fulcrum lever to a pressure which is variable according to the load on the vehicle to control the operation of said valves, a load regulated valve device for varying the pressure effective on said other end of the fulcrum lever, and a reservoir connected to said valve device adapted to prevent variations in the pressure acting on said other end of the fulcrum lever when said valve device is operated otherwise than by the load on the vehicle.

21. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, means for subjecting one end of said fulcrum lever to a substantially constant pressure and means for subjecting the other end of said fulcrum lever to a pressure which is variable according to the load on the vehicle to control the operation of said valves, a load regulated valve device for varying the pressure effective on said other end of the fulcrum lever, and a reservoir connected to said valve device adapted to be charged with fluid under pressure supplied by said load regulated valve device for stabilizing the pressure acting on said other end of the fulcrum lever when said valve device is operated by vibrations of the vehicle due to track conditions.

22. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, means for subjecting one end of said fulcrum lever to a substantially constant pressure and means for subjecting the other end of said fulcrum lever to a pressure which is variable according to the load on the vehicle to control the operation of said valves, a load regulated valve device for varying the pressure effective on said other end of the fulcrum lever, and means for stabilizing the pressure of fluid acting on said other end of the fulcrum lever when said load regulated valve device is operated by vibrations of the vehicle due to track conditions.

23. In a variable load brake apparatus for a vehicle, the combination with a load regulated mechanism having a fulcrum lever, of a movable fulcrum for said lever, fluid pressure operative means for adjusting the position of said fulcrum according to the load on the vehicle, means for subjecting one end of said fulcrum lever to a substantially constant pressure and means for subjecting the other end of said fulcrum lever to a pressure which is variable according to the load on the vehicle to control the operation of said valves, a load regulated valve device for varying the pressure effective on said other end of the fulcrum lever, and means adapted to prevent a sudden change in the pressure of fluid acting on said other end of the fulcrum lever when said load regulated valve device is operated otherwise than by the load on the vehicle.

24. In a variable load brake apparatus for a car, the combination with a load regulated mechanism operative to control the braking power according to the load on the car, of a valve device carried by the body of the car operative to supply or release fluid under pressure to and from said load regulated mechanism to regulate said mechanism, pressure means carried by a fixed part of a truck of the car and means included in said valve device subject to the opposing pressures of said pressure means and fluid supplied to said load regulated mechanism for controlling the operation of said valve device.

25. In a variable load brake apparatus for a car, the combination with a load regulated mechanism operative to control the braking power according to the load on the car, of a valve device interposed between the body and truck of the car operative to supply and release fluid under pressure to and from said load regulated mechanism for regulating said mechanism pressure means cooperating with said valve, and means included in said valve device subject to the opposing pressures of said pressure means and the pressure of fluid supplied to said load regulated mechanism for controlling the operation of said valve device.

26. In a variable load brake apparatus for a car, the combination with a load regulated mechanism operative to control the braking power according to the load on the car, of a valve device operative to supply and release fluid under pressure to and from said mechanism for adjusting said mechanism, and means included in said valve device subject to the load on the car and the pressure of fluid supplied to said mechanism for controlling the supply and release of fluid to and from said mechanism.

27. In a variable load brake apparatus for a car, the combination with a load regulated mechanism operative to control the braking power according to the load on the car, of a valve device operative to supply and release fluid under pressure to and from said mechanism for adjusting said mechanism, and means included in said valve device subject to the load on the car and the pressure of fluid supplied to said mechanism for controlling the supply and release of fluid to and from said mechanism, and for controlling the closing off of the supply and release of fluid under pressure to and from said mechanism when said mechanism is adjusted according to the load on the car.

28. In a variable load brake apparatus for a car, the combination with a load regulated mechanism operative to control the braking power according to the load on the car, of a valve device mounted on the body of the car operative to supply and release fluid under pressure to and from said mechanism for adjusting the mechanism according to the load on the car, said valve device comprising a plurality of parts movable relative to each other, a pressure sensitive element secured to one of said parts adapted to operate the other of said parts, said element being subject to the opposing pressures of fluid supplied to said mechanism and pressure caused by the load on the car, and valves operative upon the movement of one of said parts relative to the other of said parts for controlling the pressure of fluid in said mechanism.

29. In a variable load brake apparatus for a car, the combination with a load regulated mechanism for controlling the braking power according to the load on the car and adapted to be adjusted pneumatically, of a valve device mounted on the body of the car operative to control the pressure of fluid for adjusting said mechanism, said valve device comprising a plurality of movable parts, valves operative upon the movement of one of said parts relative to the other for controlling the adjusting pressure in said mechanism, and a member secured to one of said parts subject to the pressure of fluid in said mechanism and to the load on the car for operating one of said parts to control the operation of said valves.

30. The combination with a brake cylinder on a locomotive and a brake cylinder on the tender of the locomotive, of a brake pipe, a load regulated mechanism operative to control the braking power on the tender according to the load on the tender, and means included in said mechanism subject at one time to the opposing pressures of a substantially constant pressure and brake pipe pressure for adjusting said mechanism and at another time subject to the opposing pressures developed in the locomotive brake cylinder and tender brake cylinder for supplying fluid under pressure to the tender brake cylinder according to the adjustment of said mechanism.

31. The combination with a brake cylinder on a locomotive and a brake cylinder on the tender of the locomotive, of a brake pipe, a load regulated mechanism operative to control the braking power on the tender according to the load on the tender, means included in said mechanism subject at one time to a substantially constant pressure and the pressure of fluid supplied from said brake pipe for adjusting said mechanism and at another time subject to the opposing pressures developed in the locomotive brake cylinder and the tender brake cylinder for supplying fluid under pressure to the tender brake cylinder according to the adjustment of said mechanism, and valve means subject to the locomotive brake cylinder pressure for subjecting said means to said pressures.

32. The combination with a brake cylinder on a locomotive and a brake cylinder on the tender of the locomotive, of a brake pipe, a load regulated mechanism operative to control the braking power on the tender according to the load on the tender, means included in said mechanism subject at one time to a substantially constant pressure and the pressure of fluid supplied from said brake pipe for adjusting said mechanism and at another time subject to the opposing pressures developed in the locomotive brake cylinder and the tender brake cylinder for supplying fluid under pressure to the tender brake cylinder according to the adjustment of said mechanism, a valve device operative to subject said means to said pressures and a valve subject to the locomotive brake cylinder pressure for controlling the operation of said valve device.

33. The combination with a brake cylinder on a locomotive and a brake cylinder on the tender of the locomotive, of a brake pipe, a load regulated mechanism operative to control the braking power on the tender according to the load on the tender, a reducing valve device for supplying fluid under pressure from said brake pipe to said mechanism, a regulating valve device operative according to the load on the tender for supplying fluid under pressure to said mechanism, means included in said mechanism subject at one time to the opposing pressures of fluid supplied by said reducing valve and by said regulating valve device for adjusting said mechanism and at another time subject to the opposing pressures developed in the locomotive brake cylinder and the tender brake cylinder for effecting an application of the brakes on the tender according to the adjustment of said mechanism, and a valve device operative to subject said means to said opposing pressures.

34. The combination with a brake cylinder on a locomotive and a brake cylinder on the tender of the locomotive, of a brake pipe, a load regulated mechanism operative to control the braking power on the tender according to the load on the tender, a reducing valve device for supplying fluid under pressure from said brake pipe to said mechanism, a regulating valve device operative according to the load on the tender for supplying fluid under pressure to said mechanism, means included in said mechanism subject at one time to the opposing pressures of fluid supplied by said reducing valve and by said regulating valve device for adjusting said mechanism and at another time subject to the opposing pressures developed in the locomotive brake cylinder and the tender brake cylinder for effecting an application of the brakes on the tender according to the adjustment of said mechanism, a valve device operative to subject said means to said opposing pressures, and means subject to the locomotive brake cylinder pressure for controlling the operation of said valve device.

35. The combination with a brake cylinder on a locomotive and a brake cylinder on the tender of the locomotive, of a brake pipe, a load regulated mechanism operative to control the braking power on the tender according to the load on the tender, a reducing valve device for supplying fluid under pressure from said brake pipe to said mechanism, a regulating valve device operative according to the load on the tender for supplying fluid under pressure to said mechanism, a fulcrum lever included in said mechanism, a fulcrum for said lever shiftable according to the load on the tender, pistons operative by fluid under pressure for shifting said fulcrum, and means for controlling the pressures of fluid acting on said pistons, said means comprising a piston connected to one end of said lever, subject to the pressure of fluid supplied by said reducing valve device, a piston connected to the other end of said lever subject to the pressure of fluid supplied by said regulating valve device, valves operative by said pistons for controlling the pressure of fluid acting on the first mentioned pistons to adjust the position of said fulcrum according to the load on the tender, and means operative upon the effecting of an application of the locomotive brakes for subjecting the pistons connected to said lever to the opposing pressures developed in the locomotive brake cylinder and the tender brake cylinder for controlling the tender brake cylinder pressure according to the load on the tender.

36. In a variable load brake apparatus, the combination with means adjusted by fluid under pressure for varying the braking power, of means operated according to the load on the vehicle for varying the fluid pressure on said adjustable means.

37. In a variable load brake apparatus, the combination with means adjusted in accordance with the degree of fluid under pressure supplied thereto for varying the braking power, of means for varying the pressure of fluid supplied to said adjustable means according to variations in the load on the vehicle.

38. In a variable load brake apparatus, the combination with an engine brake cylinder and means for supplying fluid under pressure to the engine brake cylinder to effect an application of the brakes, of a tender brake cylinder and means operated according to the load on the tender for supplying fluid under pressure from the engine brake cylinder to the tender brake cylinder.

In testimony whereof I have hereunto set my hand, this 20th day of November, 1928.

JOSEPH C. McCUNE.